United States Patent [19]
Gilliland et al.

[11] Patent Number: 5,349,377
[45] Date of Patent: Sep. 20, 1994

[54] PRINTER TONER USAGE INDICATOR WITH IMAGE WEIGHTED CALCULATION

[75] Inventors: W. Keith Gilliland, Webster; Christian G. Midgley, Fairport; Alison M. Murphy, Penfield; Wayne T. Bowerman, Fairport, all of N.Y.

[73] Assignee: Xerox Corporation, Stamford, Conn.

[21] Appl. No.: 62,971

[22] Filed: May 17, 1993

[51] Int. Cl.$^5$ .................. G01D 15/06; G03G 15/08
[52] U.S. Cl. ............................ 346/153.1; 355/245
[58] Field of Search ............... 346/153.1, 160; 355/245, 246, 208; 118/688–690

[56] References Cited

U.S. PATENT DOCUMENTS

| | | | |
|---|---|---|---|
| 3,409,901 | 11/1968 | Dost et al. | 346/202 |
| 4,468,112 | 8/1984 | Suzuki et al. | 355/14 D |
| 4,566,014 | 1/1986 | Paranjpe | 346/1.1 |
| 4,847,659 | 7/1989 | Resch, III | 355/202 |
| 4,908,666 | 3/1990 | Resch, III | 355/246 |
| 5,204,698 | 4/1993 | LeSueur et al. | 346/160 |
| 5,204,699 | 4/1993 | Birnbaum et al. | 346/160 |
| 5,291,296 | 3/1994 | Hains | 355/245 X |

FOREIGN PATENT DOCUMENTS 2153619  8/1985  United Kingdom.

*Primary Examiner*—R. L. Moses

[57] ABSTRACT

An improved system for more accurately estimating consumption of toner imaging material in a digital xerographic printer in relation to a count of the digital pixels generating the various images being printed, where the frequency rates of the switching between print and non-print pixels are analyzed to provide weighting factors corresponding to different types of images being printed which affect the consumption of imaging material by the printer, and the pixel counts are weighted by these weighting factors to provide an imaging material consumption calculation based on image types as well as image pixel counts. The pixel count weighting factor is automatically substantially increased for the higher print/nonprint rates, or pixel on/off frequencies, and higher toner consumption by fringe field development, corresponding to halftone images in comparison to solid area images. The pixel count weighting factor is intermediately increased for intermediate imaging frequencies corresponding to normal line text.

4 Claims, 1 Drawing Sheet

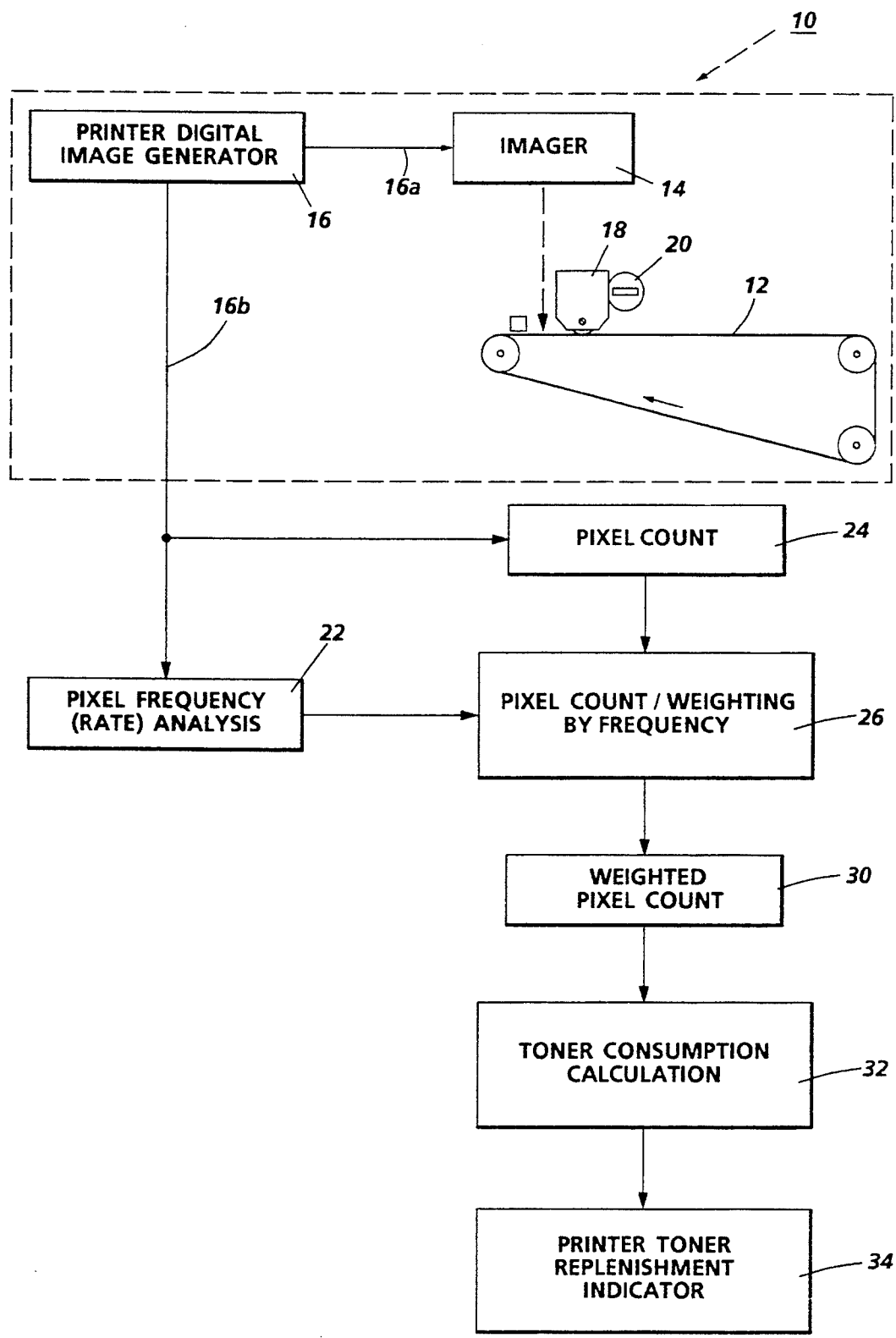

PRINTER TONER USAGE INDICATOR WITH IMAGE WEIGHTED CALCULATION

The disclosed system provides a simple, low-cost system for an improved, more accurate, image developer material consumption calculation for an electronic digital printer and/or digital copier (hereinafter, printer). That improved calculation may be used to better predict in advance and/or confirm the imaging material depletion and/or replacement needs of a digital printer, and to signal or communicate that information.

Alternatively or additionally this system may be used in the maintenance of the proper ratio of toner to carrier in [one or more] two-component image development systems of a xerographic printer.

As will be further described herein, an estimate of cumulative toner usage since a fresh toner supply cartridge or module was installed in a printer can be obtained with the disclosed system of weighting the pixel count for changes in toner usage due to image changes, and summing these weighted pixel counts. The pixels are weighted according to image type, such as whether they occur in a solid image area, a line image area, or a halftone or greyscale image area. In the example below, that may be detected by the frequency or rate of change between print and non-print pixels in a line scan or other sampling period. That is, this pixel weighting may be done by monitoring the frequency, as well as the numbers, of black [image] "bits" in the data stream to the imager, and assigning a weight to that monitored frequency range, as described.

The disclosed system is particularly subtle for low-volume printers with relatively small toner cartridges requiring replacement. However, it can be utilized with any printer for which a high-cost or low reliability low-toner sensor is undesirable.

The disclosed exemplary system is an improvement over the prior art image print pixel (image bit or byte) counting methods suggested to approximate xerographic printer engine toner usage in patents and applications cited below. The improvement here relates to the recognition and effective use of different weighting factors for differing toner usage as a function of the type of image which the image generating pixels are generating (e.g., solid area vs. halftone vs. line text). That is, the disclosed system can utilize the existing printer binary imaging signals, but modifies or weights the count thereof with a variable weighting factor based upon the recognition, by on-off pixel frequency, of the image areas in which these pixels lie, to compensate for fringe field development effects on toner consumption.

More specifically, here pixel counts are desirably "weighted" more heavily (for more toner consumption) for higher frequency pixel rates, which correspond to halftones (frequent changes between black and white bits or pixels), and/or greyscale or other dotted images. Both said images use more toner for their development than large solid image areas, due to image edge "fringe field development"; a known, but usually unquantified, phenomena of xerography. In large (all black) image areas, where there is a low frequency of changes between black and white pixels, there is little or no such toner consumption increase, because there are far less image edge fringe fields.

A specific feature of the specific embodiments disclosed herein is to provide an improved system for more accurately estimating consumption of imaging material in a digital printing apparatus in relation to the digital pixels which are being used to generate the various images being printed in said printing apparatus, wherein a count of digital image pixels is accumulated; wherein the frequency rates of said digital pixels switching between print and non-print pixels are analyzed to provide weighting factors corresponding to different types of images being printed which affect said consumption of imaging material by said printer, and said pixel counts corresponding to said frequency rates are weighted by said weighting factors in said pixel count accumulation to provide an imaging material consumption estimation calculation based on image types as well as image pixel counts.

Further specific features provided by the embodiment disclosed herein, individually or in combination, include those wherein said pixel count weighting factor is automatically substantially increased for higher said print/nonprint rates of pixel on/off frequencies corresponding to halftone images in comparison to solid area images, with lower said frequencies; and/or wherein said printer is a xerographic printer wherein toner imaging material consumption for image printing is increased by field effects in halftone and other higher frequency print/non-print pixel transitions; and/or wherein said pixel count weighting factor is intermediately increased for intermediate imaging frequencies corresponding to normal line text.

By way of background, Xerox Corporation U.S. application No. 07/944,623, filed Sep.14, 1992 (D/91130), entitled, "Apparatus for Estimating Toner Usage", by David Birnbaum, et al., now U.S. Pat. No. 5,204,699 issued Apr. 20, 1993, is directed toward a method of approximately toner usage of a printer as a function of the greyscale value of the image signal used to generate the pixel. More specifically, that function may be linear or nonlinear, depending upon the xerographic engine characteristics. The system herein can also be used with, or incorporate, said additional weighting for said assigned greyscale value, where the printer is one in which the pixels do have a (varying) greyscale value, e.g., by a variably modulated intensity imaging beam, and/or "pixels" which are actually patterns of several (e.g.,9) imaging beam dots or bits turned on or off in various rates and patterns within each said plural-bit pixel.

Also noted is Xerox Corporation U.S. Pat. No. 5,204,698, issued Apr.20, 1993, (R/91010), entitled "Toner Monitoring In An Electrostatographic Digital Printing Machine," by E. J. LeSueur, the U.K. parent application of which was published on Mar. 17, 1993 as U.K. No. 2,259,583. As taught therein, and in art cited therein and below, pixel counting systems can be combined with known imaging surface toner development test patch density measurement systems to predict an empty toner supply, or adjust toner dispensing, if desired.

Issued patent background art is cited in the above-noted applications. For example, in electronic printing or digital copying machines, it is known to estimate toner usage by monitoring (counting) the number of print signals (pixels) applied to the image generator or printing head, and to replenish the developer mixture with toner accordingly. Printing machines in which that approach is suggested are described in U.S. Pat. Nos. 3,409,901; 4,847,659; and 4,908,666. Also noted was U.S. Pat. No. 4,468, 112, issued Aug. 28, 1984 to A. Suzuki, et al.

By way of further background on printers with halftone image printing, and/or image or plural-bit pixel processing, there is additionally noted U.S. patent application Ser. No. 08/004479 by Shiau published as EP-A2 0 521 662 on Jan. 7, 1993; and U.S. Pat. Nos. 4,194,221 to Stoffel; 4,811,115 to Lin et al; 4,275,413 to Sakamoto; and 4,500,919 to Schreiber. U.S. Pat. No. 4,556,918 to Yamazaki et al. shows an arrangement assuming a periodicity of an area of halftone dots which are thresholded against an average value derived from the area to produce a density related video signal; U.S. Pat. No. 4,251,837 to Janeway shows the use of a three decision mode selection for determining threshold selection based on gradient constants for each pixel; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system. U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al. teaches a method of processing gray level values, depending on the density level of blocks of pixels, and their difference from a minimum or maximum value. The blocks are then processable by a halftone processing matrix depending on the difference value. U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

Of particular interest, GB 2,153,619A provides a similar to the above determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image.

Further by way of background, as to examples of possible means for indication and/or transmission of toner supply status information after its prediction by the disclosed system (e.g., a low or out of toner condition), there is also noted the recent Xerox Disclosure Journal, Vol. 17, No. 4, published July, 1992, by L. C. Barron and Sarsfield McNulty entitled "Xerographic Copy Cartridge Life Optimization," pp. 259–260.

It is, of course, known that pictorial or other halftone images have higher spatial component frequencies, e.g., "A Survey of Electronic Techniques for Pictorial Reproduction" by J. C. Stoffel and J. F. Moreland, Chapter 6, IEEE Transactions on Communications, Vol. COM-29, No. 12, December 1981, pp. 1898–1925.

The disclosed apparatus may be readily operated and controlled in a conventional manner with conventional control systems, such as the existing ones in printers and their controllers. It is well known in general and preferable to program and execute such control functions and logic with conventionally written software instructions for conventional microprocessors. This is taught by various patents and commercial printers. Such software may of course vary depending on the particular function and the particular software system and the particular microprocessor or microcomputer being utilized, but will be available to or readily programmable by those skilled in the applicable arts without undue experimentation from either verbal functional descriptions and/or flowcharts, such as those provided herein, and prior knowledge of software for arithmetic and other functions which is conventional, or even pre-existing, together with general knowledge in the software and computer arts. Controls may alternatively be provided utilizing various other known or suitable hard-wired logic or switching systems, as further discussed below. The Federal Circuit has held that if a microprocessor is indicated in the specification, one skilled in the art would know how to perform the necessary steps or desired functions described in the specification, and is not required to disclose actual software or "firmware" for 35 USC §112 disclosure support. In re Hayes Microcomputer Products Inc. Patent Litigation (CA FC Dec. 23, 1992).

As to other specific hardware components of the subject apparatus, or alternatives therefor, including, e.g., operator displays or indicators, etc., it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description of this embodiment thereof, including the drawing FIGURE wherein:

The FIGURE is a schematic view and flowchart of one exemplary printer imaging material usage calculation system in accordance with this invention.

The system disclosed in the example herein for image developer material (e.g., toner) supply monitoring may be provided for various electrostatographic electronic printing and/or digital copying machines in which an electrostatic latent image is electrically formed on an imaging member by various image generators, such as a laser beam, an LED array or bar, biased electrodes, ion emitters, printing heads or the like, for imaging of digital image input signals to form latent images on the imaging member which are then developed with said image developer material. The imaging member may be a photoreceptor and/or insulative surface drum or belt. The developed image is then normally transferred to a copy sheet. This system can be used with color and/or black and white printers.

Referring to the FIGURE, an electronic printer 10 is shown schematically, with a photoreceptor imaging belt 12, the surface of which is imaged by an imager 14, such as a modulated on/off scanning laser, driven by a digital image generator 16. That latent image may be developed by a developer unit 18 fed toner by a toner supply dispenser 20, here a replaceable toner cartridge unit. The above-numbered items may all be conventional, and thus need not be further described herein.

All of these components are well known, and the cited and other art provides examples and alternatives.

The digital image generator 16 (which may be internal or remote from the printer 10, or partially therein) generates the image to be printed in an electronic pixel (or bit) stream 16a, which here is also tapped at 16b and sent to be both frequency or rate analyzed (22) and also counted (24), but with a weighting factor assigned (26) by frequency analysis (22), to give a weighted pixel count (30). This can directly provide a toner consumption estimate calculation (32) which in turn can be subtracted from the (known) original amount of toner in the toner container 20 to tell the remaining amount of toner and provide or signal indicator (34) thereof.

By monitoring the frequency of black to white bits in a raster line (or other selected time period or image area) a determination can be made as to what type of image is being exposed on the photoreceptor. In this example, the black or "on" bits are here the imaging pixels [however, this system will also function on a "write white" printing system], and correspond to the smallest spot or mark that the laser beam will print. There are 300 pixels per inch in the Xerox "4213" printer, for example.

As noted, halftones and gray scales, where the pixels are turned on and off at a high frequency, consume substantially more toner than a solid image area because of fringe field development effects around the edges of each of the image areas. In the case of solid areas, the frequency will be effectively zero, because the imaging pixel is constantly on for the duration of the scan line of the solid area. The frequency for text or lines will be somewhere between these two extremes of frequencies, over some range.

After a determination of appropriate frequency ranges for the different image types, a weighting for toner usage is assigned to each image type. As each page is printed, its toner consumption can then be calculated. That consumption may then be subtracted from the previously calculated remaining balance of toner. Once the toner is calculated to be about, and/or actually, depleted, the system will notify the customer that the customer replaceable (CRU) 20 unit for toner is empty and should be replaced.

To express it another way, every CRU toner cartridge 20 comes pre-filled with a specified (known constant) initial amount of toner, which is known to the printer 10 in this system. That number may be stored as a weighted pixel count in ROM, EPROM, or other non-volatile memory, or the CRU 20 can be coded or wired to so read and indicate when it is plugged into the printer 10. As each page is printed, the pixel frequency is monitored for that page. An estimation of the average image type [halftone, line (text), or solid] is determined for that page, preferably line by line. The number of pixels for that line (or page) is then assigned a weight per pixel for that image type. This calculated toner amount is subtracted from the remaining balance of toner. This new toner amount balance value is saved. The next page of pixels is then calculated and subtracted from this value. This process continues until the warning level for remaining toner is attained. The user is then alerted that the toner CRU is nearing it's "end-of-life" condition. The process continues until a calculated remaining toner amount of zero is attained, which should coincide with the toner cartridge being empty. That is, continuously subtracting calculated toner usage this way (with printer imaging) from the known initial installed toner amount until the balance amount reaches zero automatically gives an "out of toner" indication, without ever actually sensing or examining the toner container itself.

The actual pixel weighting factors will vary with the particular printer, and should be [readily] experimentally empirically determined by counting pixels and measuring toner usage for different images in a test machine of that type (under conditions of suitable area image coverage and density). That is, the "fringe-field" effect will vary with different printers due to differences in the photoreceptor, its charge/discharge levels, the development and developer bias level system, the toner, etc.. Also, the frequency of the pixel rate for any given image may vary between printers due to differences in the imager spot size and spacing or resolution (pixels per centimeter) and the scanning rate (the sweep rate of the laser beam or on/off rate and LED spacing of the LED image bar).

The following are examples of how weighting factors by frequency which can be assigned. A weight of unity, or "1" can be assigned for a pixel on/off frequency of less than X per line scan (or some unit of time), a 1.x weight for a frequency of between X and Y per line and a higher 1.y weight for a higher frequency of Y or greater per line, etc. This weighing, once assigned, can be stored and retrieved by a simple look-up table or simple program in the existing printer microprocessor controller, or other chip, e.g., simply counting the total number of "on/off" pixel changes in each raster scan time (or other selected time period for sampling) as the "frequency."

The existing raster scan (one laser line scan or sweep, or one LED bar line set of signals) is suitable for use as the frequency sampling rate, because there is an existing "end-of-line" signal to mark it (and a time delay between each such raster scan) to thus define a known sampling period within which the number of black to white or white to black [write or not write] transition signals can be counted to determine their frequency; and during which the total number of black or image pixels can also be counted between the same end-of-line signals, and weighted by the former as taught herein, and this weighted count buffered or stored, line by line. (Additionally, line by line comparison of vertically adjacent pixels can be weighted using the same algorithms as for horizontal pixels, to provide better precision, but at more cost.) (Conventionally, to save memory, this count can be divided or rounded off to higher significant digits, or averaged over several lines.) The calculation of toner consumption and estimation of remaining toner can be done image page by image page, as noted.

An additional weighting factor input could be the developer system voltage bias level, typically set by operator controls for "copy lighter/copy darker", or the like, which settings, if frequently used, and/or not promptly default reset to normal, can also affect the toner consumption rate.

Although the pixel frequency sampling and pixel weighting and counting could alternatively be done by connected hard-wired buffers, counters and/or timers, conventional software controlled microprocessor calculation is preferred, as noted above. Another alternative might be a simple, hard-wired analog weighting system, such as to impress the "on/off" bit stream across a simple, conventional capacitor/resister integrator circuit and/or operational amplifier and/or rectify it with a diode to derive a variable D.C. weighting voltage level proportional to the integral of the on/off pixel rate, which could be used with an A/D converter as a multiplier or adder against the image pixel counts being accumulated at that time.

There are now several commercial combination or plural mode products with facsimile, scanner, copier and printer capabilities all in one unit. These and other printers may provide for different pixel resolutions in different operating modes. E.g., typically facsimile is both sent and printed out at a lower resolution than a normal scanner/printer connection or a digital copier or a non-fax print generated or sent from a terminal or screen. Furthermore, a printer may have an optional higher speed but lower resolution "draft" or "proof set" printing mode. Printer on/off frequency may also change i an image magnification mode, even if pixel interpolation is provided. Various of these different printer operating modes may result in a change in the pixel on/off rate or frequency which may also affect toner consumption. That can be automatically accommodated by the present system.

The system disclosed herein can provide substantial hardware cost savings, and repair or maintenance cost savings, as compared to other "low toner" or "out of toner" sensor systems which require optical, sonic, torque, weight or other sensors in or associated with the toner supply or dispenser, and associated wiring. Although this example is for a xerographic system, this subject system may also be usable for ionographic printing or the like.

While the embodiment disclosed herein is preferred, it will be appreciated from this teaching that various alternatives, modifications, variations or improvements therein may be made by those skilled in the art, which are intended to be encompassed by the following claims:

What is claimed is:

1. An improved system for more accurately estimating consumption of imaging material in a digital printing apparatus in relation to the digital pixels which are being used to generate the various images being printed in said printing apparatus, wherein a count of digital image pixels is accumulated; wherein the frequency rates of said digital pixels switching between print and non-print pixels are analyzed to provide weighting factors corresponding to different types of images being printed which affect said consumption of imaging material by said printer, and said pixel counts corresponding to said frequency rates are weighted by said weighting factors in said pixel count accumulation to provide an imaging material consumption estimation calculation based on image types as well as image pixel counts.

2. The improved system for more accurate digital printer imaging material consumption estimation of claim 1, wherein said pixel count weighting factor is automatically substantially increased for higher said print/nonprint rates of pixel on/off frequencies corresponding to halftone images in comparison to solid area images, with lower said frequencies.

3. The improved system for more accurate digital printer imaging material consumption estimation of claim 1, wherein said printer is a xerographic printer wherein toner imaging material consumption for image printing is increased by field effects in halftone and other higher frequency print/non-print pixel transitions.

4. The improved system for more accurate digital printer imaging material consumption estimation of claim 2, wherein said pixel count weighting factor is intermediately increased for intermediate imaging frequencies corresponding to normal line text.

* * * * *